US010372824B2

(12) United States Patent
Bull et al.

(10) Patent No.: US 10,372,824 B2
(45) Date of Patent: Aug. 6, 2019

(54) DISAMBIGUATING CONCEPTS IN NATURAL LANGUAGE

(71) Applicant: INTERNATIONAL BUSINESS MACHINES CORPORATION, Armonk, NY (US)

(72) Inventors: Brendan Bull, Durham, NC (US); Paul Lewis Felt, Springville, UT (US)

(73) Assignee: International Business Machines Corporation, Armonk, NY (US)

(*) Notice: Subject to any disclaimer, the term of this patent is extended or adjusted under 35 U.S.C. 154(b) by 109 days.

(21) Appl. No.: 15/594,829

(22) Filed: May 15, 2017

(65) Prior Publication Data
US 2018/0329885 A1 Nov. 15, 2018

(51) Int. Cl.
G06F 17/27 (2006.01)
G06F 16/33 (2019.01)
G06F 16/00 (2019.01)
G10L 15/18 (2013.01)

(52) U.S. Cl.
CPC ...... *G06F 17/2785* (2013.01); *G06F 16/3334* (2019.01); *G06F 16/00* (2019.01); *G06F 16/3347* (2019.01); *G10L 15/18* (2013.01); *G10L 15/1815* (2013.01)

(58) Field of Classification Search
CPC ............. G06F 17/2785; G06F 17/2755; G06F 17/30663; G06F 17/274; G06F 17/277; G06F 17/271; G06F 17/30; G10L 15/00
USPC .......................................................... 704/9
See application file for complete search history.

(56) References Cited

U.S. PATENT DOCUMENTS

| 7,831,423 | B2 | 11/2010 | Schubert |
| 8,494,987 | B2 | 7/2013 | Katukuri et al. |
| 9,063,970 | B1 | 6/2015 | Rehling et al. |
| 9,336,306 | B2 | 5/2016 | McAteer et al. |
| 9,508,038 | B2 | 11/2016 | Ferrucci et al. |
| 2005/0080613 | A1* | 4/2005 | Colledge ............. G06F 17/2785 704/9 |

(Continued)

FOREIGN PATENT DOCUMENTS

WO 2011082055 A1 7/2011

OTHER PUBLICATIONS

IBM: List of IBM Patents or Patent Applications Treated as Related (Appendix P), Mar. 20, 2018, pp. 1-2.

(Continued)

Primary Examiner — Bharatkumar S Shah
(74) Attorney, Agent, or Firm — Dmitry Paskalov

(57) ABSTRACT

A computer receives a plurality of text and determines a concept is present in the plurality of text. The computer determines a set of hypotheses for the determined concept, wherein the set of hypotheses is a plurality of natural language representations of the determined concept. The computer substitutes the determined concept in the plurality of text with a hypothesis from the determined set of hypotheses. The computer determines the hypothesis is valid based on analyzing the plurality of text with a neural network, wherein the neural network is trained for hypothesis validation. Based on determining that the hypothesis is valid, the computer storing the plurality of text with the determined hypothesis in place of the substituted concept and displays the stored plurality of text.

14 Claims, 5 Drawing Sheets

(56) References Cited

U.S. PATENT DOCUMENTS

| | | | |
|---|---|---|---|
| 2007/0094216 A1* | 4/2007 | Mathias | G06N 5/04 706/52 |
| 2007/0106493 A1 | 5/2007 | Sanfilippo et al. | |
| 2009/0192954 A1* | 7/2009 | Katukuri | G06F 19/324 706/11 |
| 2012/0084076 A1 | 4/2012 | Boguraev et al. | |
| 2013/0138696 A1 | 5/2013 | Turdakov et al. | |
| 2014/0163959 A1 | 6/2014 | Hebert et al. | |
| 2014/0309990 A1 | 10/2014 | Gandrabur et al. | |
| 2015/0142420 A1* | 5/2015 | Sarikaya | G06F 17/279 704/9 |
| 2016/0012336 A1 | 1/2016 | Franceschini et al. | |
| 2016/0132648 A1 | 5/2016 | Shah et al. | |
| 2016/0179945 A1 | 6/2016 | Lastra Diaz et al. | |
| 2016/0188565 A1 | 6/2016 | Robichaud et al. | |

OTHER PUBLICATIONS

Mell et al., "The NIST Definition of Cloud Computing," National Institute of Standards and Technology, U.S. Department of Commerce, Special Publication 800-145, Sep. 2011, pp. 1-7.

Yuan et al., "Word Sense Disambiguation with Neural Language Models.", arXiv:1603.07012v1 [cs.CL], Mar. 22, 2016, pp. 1-10.

McInnes et al., "Using UMLS Concept Unique Identifiers (CUIs) for Word Sense Disambiguation in the Biomedical Domain", AMIA Annual Symposium Proceedings 2007, https://www.ncbi.nlm.nih.gov/pmc/articles/PMC2655788/, pp. 1-9, Printed on Apr. 7, 2017.

Cambria et al., "Jumping NLP Curves: A Review of Natural Language Processing Research", IEEE Computational Intelligence Magazine, May 2014, Date of publication: Apr. 11, 2014, pp. 48-57.

Hoffart et al., "Robust Disambiguation of Named Entities in Text", Proceedings of the 2011 Conference on Empirical Methods in Natural Language Processing, pp. 782-792, Edinburgh, Scotland, UK, Jul. 27-31, 2011, copyright 2011 Association for Computational Linguistics.

Jimeno-Yepes et al., "Collocation analysis for UMLS knowledge-based word sense disambiguation", BMC Bioinformatics, 2011;12(Suppl 3):S4, Published Online Jun. 9 2011, pp. 1-20.

Jimeno-Yepes et al., "Query expansion for UMLS Metathesaurus disambiguation based on automatic corpus extraction", 2010 Ninth International Conference on Machine Learning and Applications, pp. 965-968, Dec. 12-14, 2010.

\* cited by examiner

DISAMBIGUATING CONCEPTS IN NATURAL LANGUAGE

BACKGROUND

The present invention relates, generally, to the field of computing, and more particularly to natural language processing (NLP).

NLP is a field of computer science, artificial intelligence, and computational linguistics related to the interactions between computers and human natural languages, such as programming computers to process large natural language corpora. Disambiguating concepts in natural language is a field of computational linguistics in a computing software that identifies a meaning of a word, phrase, or abbreviation in a sentence.

SUMMARY

According to one embodiment, a method, computer system, and computer program product for disambiguating concepts in natural language are provided. The present invention may include a computer that receives a plurality of text and determines a concept is present in the plurality of text. The computer determines a set of hypotheses for the determined concept, wherein the set of hypotheses is a plurality of natural language representations of the determined concept. The computer substitutes the determined concept in the plurality of text with a hypothesis from the determined set of hypotheses. The computer determines the hypothesis is valid based on analyzing the plurality of text with a neural network, wherein the neural network is trained for hypothesis validation. Based on determining that the hypothesis is valid, the computer storing the plurality of text with the determined hypothesis in place of the substituted concept and displays the stored plurality of text.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
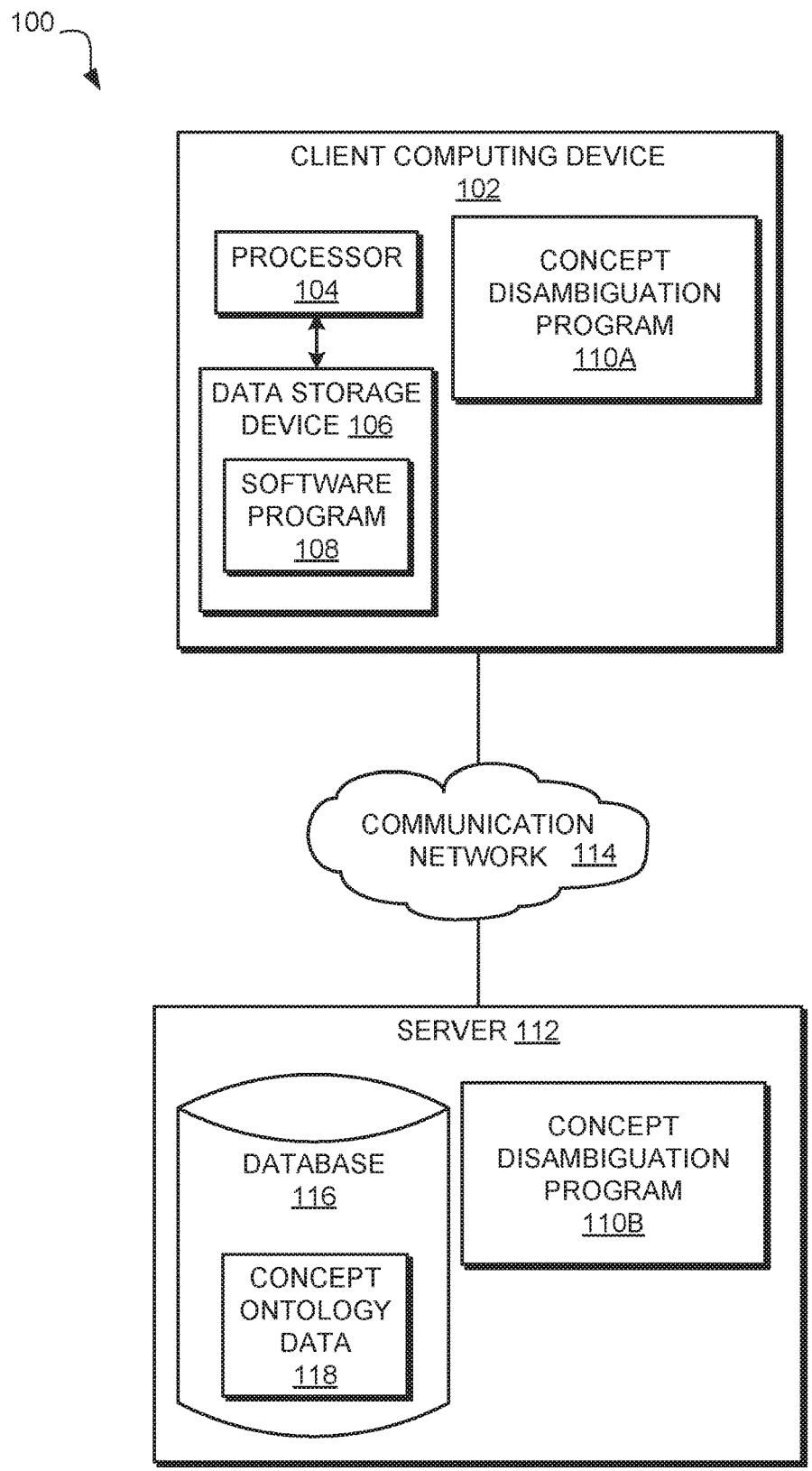
FIG. 1 illustrates an exemplary networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate to the field of natural language processing (NLP), and more particularly to disambiguating concepts in a natural language input. The following described exemplary embodiments provide a system, method, and program product to, among other things, determine a sense (meaning) of concepts in natural language input, such as speech or text. Therefore, the present embodiment has the capacity to improve the technical field of machine learning and NLP by determining a valid sense of a concept in a natural language input based on the surrounding language and context of the input.

As previously described, NLP is a field of computer science, artificial intelligence, and computational linguistics related to the interactions between computers and human natural languages, such as programming computers to process large natural language corpora. Disambiguating concepts in natural language is a field of computational linguistics in a computing software that identifies a meaning of a word, phrase, or abbreviation in a sentence.

Typically, a concept may be a word, phrase, abbreviation or acronym that may be converted into a surface form associated with a unique identification number determining the concept in concept ontology data. For example, in English the words give, gives, giving, gave and given are surface forms of the verb give and have the same sense. A word sense may be determined by word sense disambiguation (WSD) methods. WSD methods are divided into two types: knowledge-based and machine learning. Typically, knowledge-based WSD methods include accessing or building an information database that provides senses to concepts that are defined in the information database, while the machine learning approach includes neural networks that may determine a sense of a concept based on training sets the neural network was trained with. In order to produce reliable results, neural network-based WSD needs large training sets and lacks full coverage of all senses for all words in the lexicon thereby leading to unreliable results.

Another approach to determine a sense of a concept is an ontology concept sense disambiguation (CSD) method. The CSD method determines the sense of a word from concept ontology, such as Unified Medical Language System (UMLS). The concept ontology contains multi-word expressions and covers all concepts of interest. In addition, CSD databases are large and may be edited by different users and, therefore, contain invalid entries.

In many cases, methods that match a concept to a sense lack the ability to examine a surrounding context and may lead to invalid concept interpretation, such as with WSD methods that assume at least one matching definition of a word or phrase sense is valid, therefore, leading to incorrect concept interpretation. As such, it may be advantageous to, among other things, implement a system that determines a valid sense of a concept in a natural language input based on the surrounding language and context of the input.

According to one embodiment, the present invention may analyze the concepts, extract a set of possible hypotheses using matching techniques or word embedding vectorization and apply neural networks to compare the set of hypotheses to determine the valid sense of a word or a phrase based on the contextual content. Word embedding is, typically, a collective name for a set of language modeling and feature learning techniques in NLP where words or phrases from the vocabulary are mapped to vectors or coordinates of real numbers.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by processor-implemented readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to disambiguate concepts in natural language inputs by converting the natural language input to text, determining hypotheses to concepts in the text and using a neural network to validate one or more of the hypothesis as a correct natural language representations of the concept.

Referring to FIG. 1, an exemplary networked computer environment 100 is depicted, according to at least one embodiment. The networked computer environment 100 may include client computing device 102 and a server 112 interconnected via a communication network 114. According to at least one implementation, the networked computer environment 100 may include a plurality of client computing devices 102 and servers 112, of which only one of each is shown for illustrative brevity.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 102 may include a processor 104 and a data storage device 106 that is enabled to host and run a software program 108 and a concept disambiguation program 110A and communicate with the server 112 via the communication network 114, in accordance with one embodiment of the invention. Client computing device 102 may be, for example, a mobile device, a telephone, a personal digital assistant, a netbook, a laptop computer, a tablet computer, a desktop computer, or any type of computing device capable of running a program and accessing a network. As will be discussed with reference to FIG. 3, the client computing device 102 may include internal components 302a and external components 304a, respectively.

The server computer 112 may be a laptop computer, netbook computer, personal computer (PC), a desktop computer, or any programmable electronic device or any network of programmable electronic devices capable of hosting and running a concept disambiguation program 110B and a database 116 and communicating with the client computing device 102 via the communication network 114, in accordance with embodiments of the invention. As will be discussed with reference to FIG. 3, the server computer 112 may include internal components 302 a,b and external components 304 a,b respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

Database 116 may be a data repository capable of storing information, such as concept ontology data 118. Concept ontology data 118 may be a combined database with a set of software tools that is designed to allow translation among various terminology systems for NLP purposes. For example, concept ontology data 118 may be an UMLS that is a concise compilation of a body of knowledge of many controlled vocabularies in the biomedical sciences. According to the present embodiment, training data 118 may include one or more sets of information where each set is related to different parts of multi-part analogies. In another embodiment, training data 118 may be located on data storage device 106 or loaded using internal components 302 a,b or external components 304 a,b.

According to the present embodiment, the concept disambiguation program 110A, 110B may be a program capable of identifying concepts, determining hypotheses based on the concepts definition determined from the concept ontology data and determining the valid concept definition by analyzing each hypothesis in the context of the received natural language input. The method of concept disambiguation in natural language is explained in further detail below with respect to FIG. 2.

Figure 2:
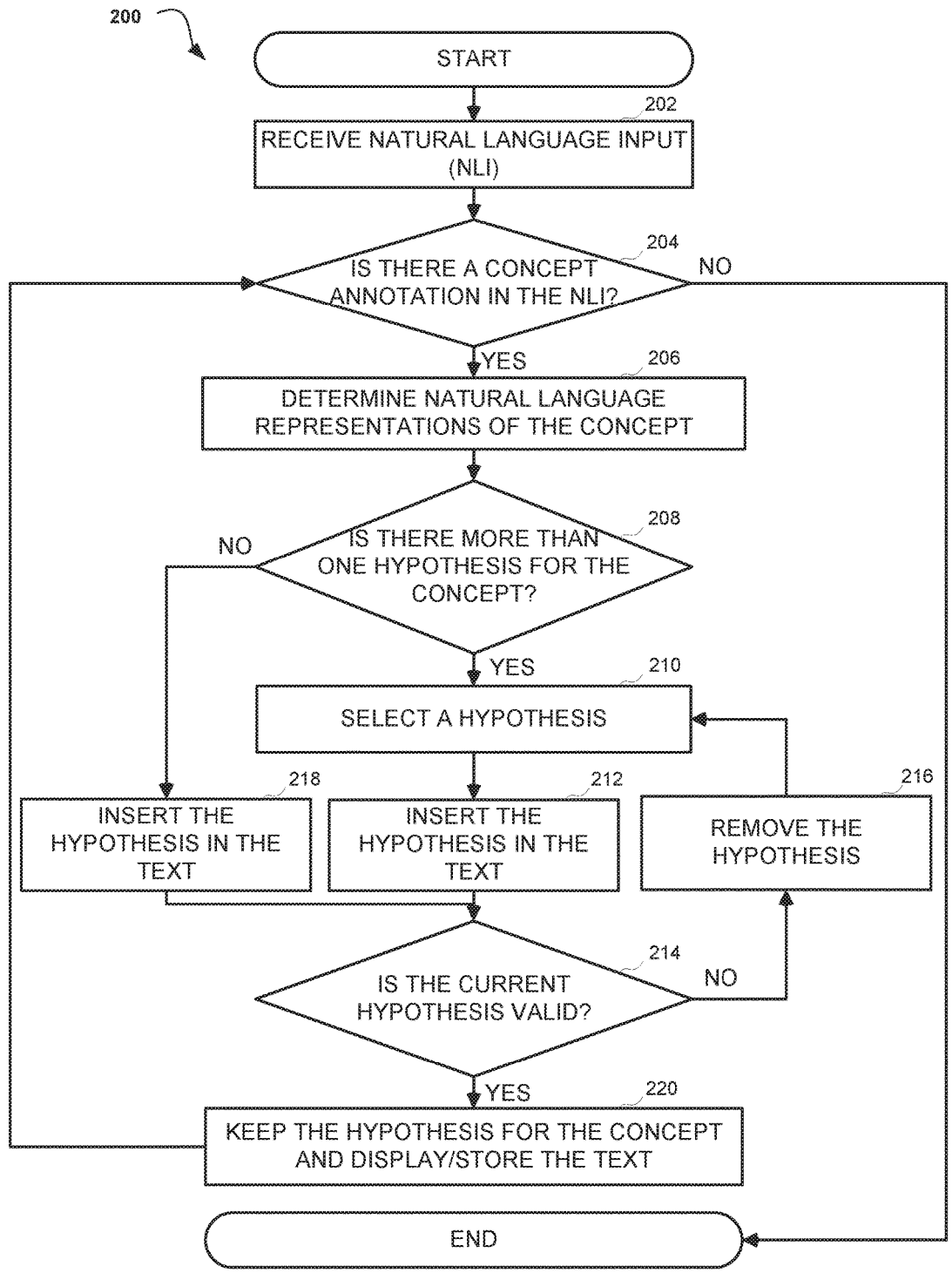
FIG. 2 is an operational flowchart illustrating a concept disambiguating process according to at least one embodiment.

Referring now to FIG. 2, an operational flowchart illustrating a concept disambiguating process 200 is depicted according to at least one embodiment. At 202, the concept disambiguation program 110A, 110B receives a natural language input. According to the present embodiment, concept disambiguation program 110A, 110B may receive a voice, image or other digital format that may be converted to text or a text input. For example, concept disambiguation program 110A, 110B may receive a digital voice data, such as an MP3 file, and convert the received digital voice data to a plurality of text using a speech-to-text algorithm, such as hidden Markov model, dynamic time wrapping speech recognition, End-to-End automatic speech recognition or another neural network-based model. In another embodiment, concept disambiguation program 110A, 110B may receive an image, such as a JPEG file or a portable document format (PDF) and convert the image file to a plurality of text using known optical character recognition (OCR) technology, such as WebOCR, that may be used in a cloud computing environment.

Then, at 204, the concept disambiguation program 110A, 110B determines whether there are any concepts that may be annotated in the text. According to the present embodiment, concept disambiguation program 110A, 110B may determine whether one of the concepts is defined in the concept ontology data 118. For example, when the concept ontology data 118 is a UMLS database, a concept "OCD" may be determined in UMLS as "Obsessive Compulsive Disorder". In another embodiment, concept disambiguation program 110A, 110B may use word embedding to convert the concept to a vector and search for similar vectors in the concept ontology data 118. If the concept disambiguation program 110A, 110B determines that there is at least one concept that may be annotated (step 204, "YES" branch), the concept disambiguation program 110A, 110B may continue to step 206 to determine natural language representations of the concept. If the concept disambiguation program 110A, 110B determines that there is no concept that may be annotated (step 204, "NO" branch), the concept disambiguation program 110A, 110B may terminate. In alternative embodiments, concept disambiguation program 110A, 110B may request a user to choose or enter a natural language representation of the concept.

Next, at 206, the concept disambiguation program 110A, 110B determines natural language representations of the concept. According to the present embodiment, concept disambiguation program 110A, 110B may determine more than one hypothesis that is a natural language representation for each concept found in the text. To continue our previous example, concept disambiguation program 110A, 110B may determine that the "OCD" concept may not only be determined as "Obsessive Compulsive Disorder" but also as an "Osteochondritis dissecans". Therefore, concept disambiguation program 110A, 110B may store "Obsessive Compulsive Disorder" and "Osteochondritis dissecans" as potential hypotheses of the "OCD" concept.

Then, at 208, the concept disambiguation program 110A, 110B determines whether there is more than one hypothesis for the concept. According to the present embodiment, concept disambiguation program 110A, 110B may attach a counter to each concept that represents a number of hypotheses available and store them in an array. To continue the previous example, a concept "OCD has two hypotheses in UMLS. If the concept disambiguation program 110A, 110B determines that there is more than one hypothesis to the concept (step 208, "YES" branch), the concept disambiguation program 110A, 110B may continue to step 210 to select one of the hypotheses. If the concept disambiguation program 110A, 110B determines that there is only one hypothesis to the concept (step 208, "NO" branch), the concept disambiguation program 110A, 110B may continue to step 218 to insert the hypothesis in the text.

Next, at 210, the concept disambiguation program 110A, 110B selects a hypothesis to the concept. According to the present embodiment, concept disambiguation program 110A, 110B may select a first stored hypothesis for the concept. Since the concept disambiguating process 200 may be iterative through multiple concepts, each concept determined in step 206 may be evaluated by the concept disambiguation program 110A, 110B. If no hypotheses remain or all the hypotheses were removed as invalid, concept disambiguation program 110A, 110B retain a concept without substituting it with the hypothesis. For example, if an abbreviation "UMLS" fails to generate hypotheses from concept ontology data 118, then concept disambiguation program 110A, 110B would retain a "UMLS" concept without converting it to a natural text representation. In another embodiment, concept disambiguation program 110A, 110B may prioritize the hypotheses using heuristics, such as prioritize hypotheses with longer surface forms or compare preferred names of the concepts from the concept ontology data. To continue the previous example, concept disambiguation program 110A, 110B may select the "Obsessive Compulsive Disorder" as a first hypothesis for the "OCD" concept and not the "Osteochondritis dissecans" because the former hypothesis has a longer surface form than the later "Osteochondritis dissecans". In case of hypothesis prioritization using preferred names of the concept, for example, if the text includes "disorder", then concept disambiguation program 110A, 110B may select as a first hypothesis for consideration that includes "disorder" in its surface form such as "Obsessive Compulsive Disorder" in the case of "OCD" concept disambiguation.

Then, at 212, the concept disambiguation program 110A, 110B inserts the selected hypothesis in the text. According to the present embodiment, concept disambiguation program 110A, 110B may store the original text with the concept and create a temporary text with the selected hypothesis inserted in the annotated text instead of the concept. To continue the previous example, concept disambiguation program 110A, 110B may select "Obsessive Compulsive Disorder" as a hypothesis for the "OCD" concept since known heuristic techniques may have identified "Obsessive Compulsive Disorder" as the most likely meaning of the "OCD" concept.

Then, at 214, the concept disambiguation program 110A, 110B determines whether the current hypothesis is valid. According to the present embodiment, concept disambiguation program 110A, 110B may use a specially trained neural network that determines whether the hypothesis is valid or invalid. The neural network may be designed to receive a text and return an output of two parameters: a local context parameter and a document context parameter. The local context parameter may be a value representing whether the hypothesis makes sense in the current sentence, such as a syntactic validity. The document context parameter may be a value representing whether the hypothesis makes sense in the context of the text, such as a topical validity. The concept disambiguation program 110A, 110B may calculate a weighted average from the local context parameter and the document context parameter and, if the average is above a threshold value, the current hypothesis may be considered valid. In another embodiment, any weighted combination of the local context parameter and the document context parameter may be used. In further embodiments, the neural network may be designed to return only a Boolean answer whether the hypothesis is valid or not. For example, the text that includes the following is analyzed by concept disambiguation program 110A, 110B: "OCD is increasingly frequently seen in pediatric, adolescent and young adult athletes. If it is not recognized and treated appropriately, it can lead to a secondary osteoarthritis with pain and functional limitation". After concept disambiguation program 110A, 110B determines that the concept "OCD" has two hypotheses in UMLS, concept disambiguation program 110A, 110B inserts the first hypothesis into the text that would look like "Obsessive Compulsive Disorder is increasingly frequently seen in pediatric, adolescent and young adult athletes. If it is not recognized and treated appropriately, it can lead to a secondary osteoarthritis with pain and functional limitation". In the current example, the hypothesis would be considered invalid, especially because the document context parameter would show that the hypothesis is invalid due to osteoarthritis (bone illness) being unrelated to obsessive compulsive disorder (mental condition). In an alternative embodiment, concept disambiguation program 110A, 110B may, in addition, substitute with a hypothesis one or more passive references of the concept. For example, instead of "it" concept disambiguation program 110A, 110B may insert the hypothesis instead of the passive reference such as "If Obsessive Compulsive Disorder is not recognized and treated appropriately, it can lead to a secondary osteoarthritis with pain and functional limitation". If the concept disambiguation program 110A, 110B determines that the hypothesis is valid (step 214, "YES" branch), the concept disambiguation program 110A, 110B may continue to step 220 to keep the hypothesis for the concept and display/store the text. If the concept disambiguation program 110A, 110B determines that the hypothesis is invalid (step 214, "NO" branch), the concept disambiguation program 110A, 110B may continue to step 216 to remove the hypothesis and select the next hypothesis for analysis.

Next, at 216, the concept disambiguation program 110A, 110B removes the hypothesis from the set of hypotheses. If the current hypothesis is determined as invalid in step 214, the concept disambiguation program 110A, 110B may remove the hypothesis from the set of hypotheses. In an alternative embodiment, concept disambiguation program 110A, 110B may, in addition, restore the original text by removing the hypothesis and inserting the concept to the text. For example, if concept disambiguation program 110A, 110B receives as an input "OCD operates community development programs and initiatives throughout rural America and provides technical support to USDA-Rural Development's community development staff in offices throughout the United States" where OCD is an abbreviation of Office of Community Development, the concept disambiguation program 110A, 110B would not substitute "OCD" with any of the hypotheses extracted from UMLS because neither "Obsessive Compulsive Disorder" nor "Osteochondritis dissecans" would be valid hypotheses.

Next, at 218, the concept disambiguation program 110A, 110B inserts the hypothesis in the text. If only one hypothesis is determined in step 208, the program may insert the hypothesis into the annotated text instead of the concept. In an alternative embodiment, concept disambiguation program 110A, 110B may store the original text with the concept and create a temporary text with the hypothesis inserted in the annotated text instead of the concept.

Then, at 220, the concept disambiguation program 110A, 110B keeps the hypothesis for the concept and displays/stores the text. According to the present embodiment, concept disambiguation program 110A, 110B may store the original text with marks or hyperlinks to each annotated concept or may insert the hypotheses instead of the concepts and display the text on display 344. In another embodiment, concept disambiguation program 110A, 110B may store the text on portable tangible storage devices 338, tangible storage devices 330 or send it via network adapter or interface 336.

It may be appreciated that FIG. 2 provides only an illustration of one implementation and does not imply any limitations with regard to how different embodiments may be implemented. Many modifications to the depicted environments may be made based on design and implementation requirements. In one implementation, concept disambiguation program 110A, 110B may find that none or more than one hypotheses are valid in the text context. For example, "breast cancer" is annotated in UMLS as "Breast Carcinoma" and "Malignant neoplasm of breast" which are both valid natural language representations of the "breast cancer", therefore, concept disambiguation program 110A, 110B may display both of the annotations. In a case that none of the hypotheses are valid, concept disambiguation program 110A, 110B may keep the concept without substituting a hypothesis for the concept, and may further mark the concept as undeterminable. In another representation, concept disambiguation program 110A, 110B may display all of the natural representations (hypotheses) of the concept to a user or only valid hypotheses, and allow the user to select the valid annotation or annotations of the concept. The concept disambiguation program 110A, 110B may then train the neural network on the text and the valid annotations (hypotheses) selected by the user using positive and negative training examples, where the negative examples are generated by random concept substitution and word substitution so that the negative examples would be topically relevant but syntactically invalid.

Figure 3:
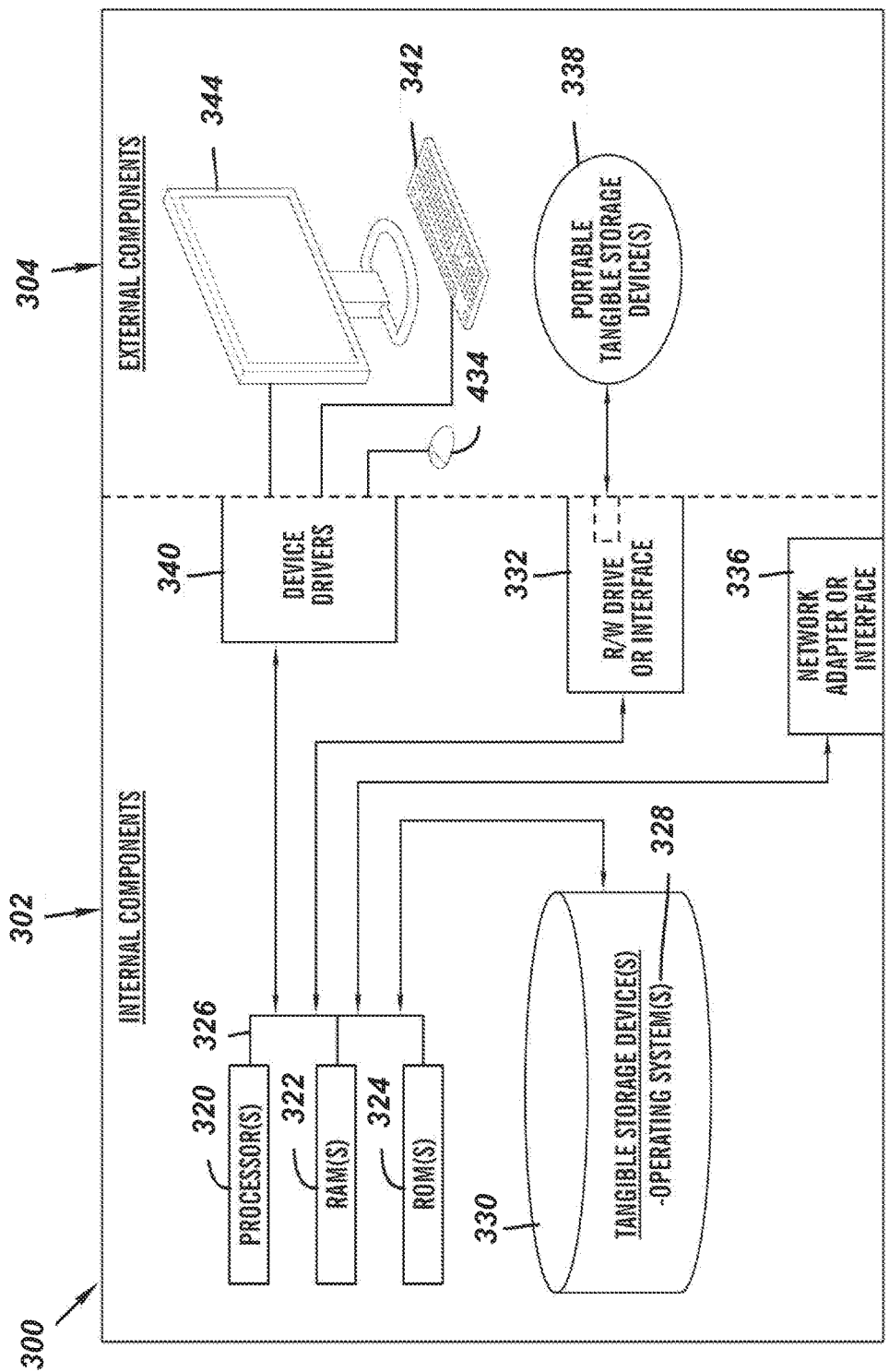
FIG. 3 is a block diagram of internal and external components of computers and servers depicted in FIG. 1 according to at least one embodiment.

FIG. 3 is a block diagram 300 of internal and external components of the client computing device 102 and the server 112 depicted in FIG. 1 in accordance with an embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

The data processing system 302, 304 is representative of any electronic device capable of executing machine-readable program instructions. The data processing system 302, 304 may be representative of a smart phone, a computer system, PDA, or other electronic devices. Examples of computing systems, environments, and/or configurations that may represented by the data processing system 302, 304 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

The client computing device 102 and the server 112 may include respective sets of internal components 302 *a,b* and external components 304 *a,b* illustrated in FIG. 3. Each of the sets of internal components 302 include one or more processors 320, one or more computer-readable RAMs 322, and one or more computer-readable ROMs 324 on one or more buses 326, and one or more operating systems 328 and one or more computer-readable tangible storage devices 330. The one or more operating systems 328, the software program 108 and the concept disambiguation program 110A in the client computing device 102, and the concept disambiguation program 110B in the server 112 are stored on one or more of the respective computer-readable tangible storage devices 330 for execution by one or more of the respective processors 320 via one or more of the respective RAMs 322 (which typically include cache memory). In the embodiment illustrated in FIG. 3, each of the computer-readable tangible storage devices 330 is a magnetic disk storage device of an internal hard drive. Alternatively, each of the computer-readable tangible storage devices 330 is a semiconductor storage device such as ROM 324, EPROM, flash memory or any other computer-readable tangible storage device that can store a computer program and digital information.

Each set of internal components 302 *a,b* also includes a R/W drive or interface 332 to read from and write to one or more portable computer-readable tangible storage devices 338 such as a CD-ROM, DVD, memory stick, magnetic tape, magnetic disk, optical disk or semiconductor storage device. A software program, such as the concept disambiguation program 110A, 110B, can be stored on one or more of the respective portable computer-readable tangible storage devices 338, read via the respective R/W drive or interface 332, and loaded into the respective hard drive 330.

Each set of internal components 302 *a,b* also includes network adapters or interfaces 336 such as a TCP/IP adapter cards, wireless Wi-Fi interface cards, or 3G or 4G wireless interface cards or other wired or wireless communication links. The software program 108 and the concept disambiguation program 110A in the client computing device 102 and the concept disambiguation program 110B in the server 112 can be downloaded to the client computing device 102 and the server 112 from an external computer via a network (for example, the Internet, a local area network or other, wide area network) and respective network adapters or interfaces 336. From the network adapters or interfaces 336, the software program 108 and the concept disambiguation program 110A in the client computing device 102 and the concept disambiguation program 110B in the server 112 are loaded into the respective hard drive 330. The network may comprise copper wires, optical fibers, wireless transmission, routers, firewalls, switches, gateway computers and/or edge servers.

Each of the sets of external components 304 *a,b* can include a computer display monitor 344, a keyboard 342, and a computer mouse 334. External components 304 *a,b* can also include touch screens, virtual keyboards, touch pads, pointing devices, and other human interface devices. Each of the sets of internal components 302 *a,b* also includes device drivers 340 to interface to computer display monitor 344, keyboard 342, and computer mouse 334. The device drivers 340, R/W drive or interface 332, and network adapter or interface 336 comprise hardware and software (stored in storage device 330 and/or ROM 324).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
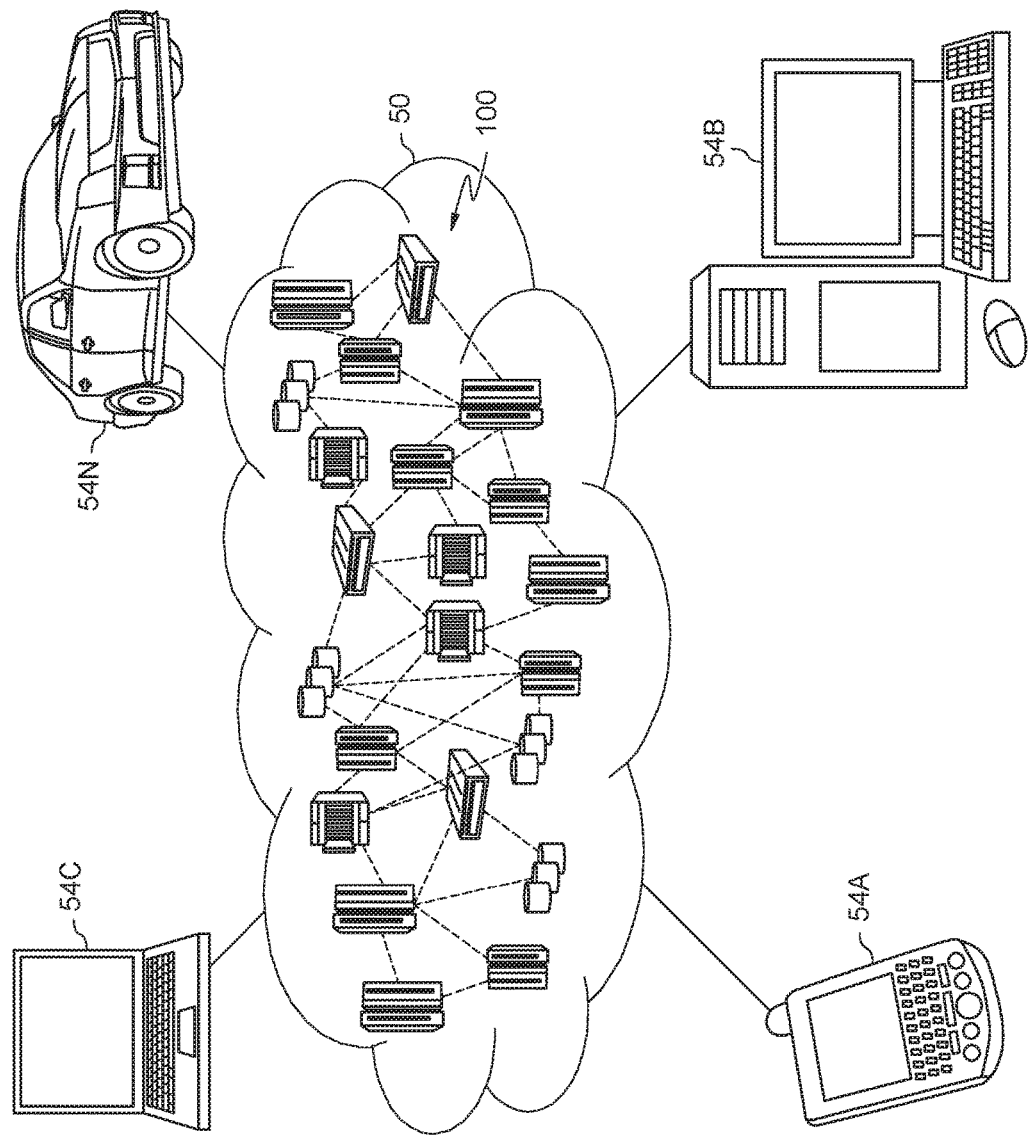
FIG. 4 depicts a cloud computing environment according to an embodiment of the present invention.

Referring now to FIG. 4, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 100 and cloud computing environment 50 can communicate with any type of computerized device over any type of network and/or network addressable connection (e.g., using a web browser).

Figure 5:
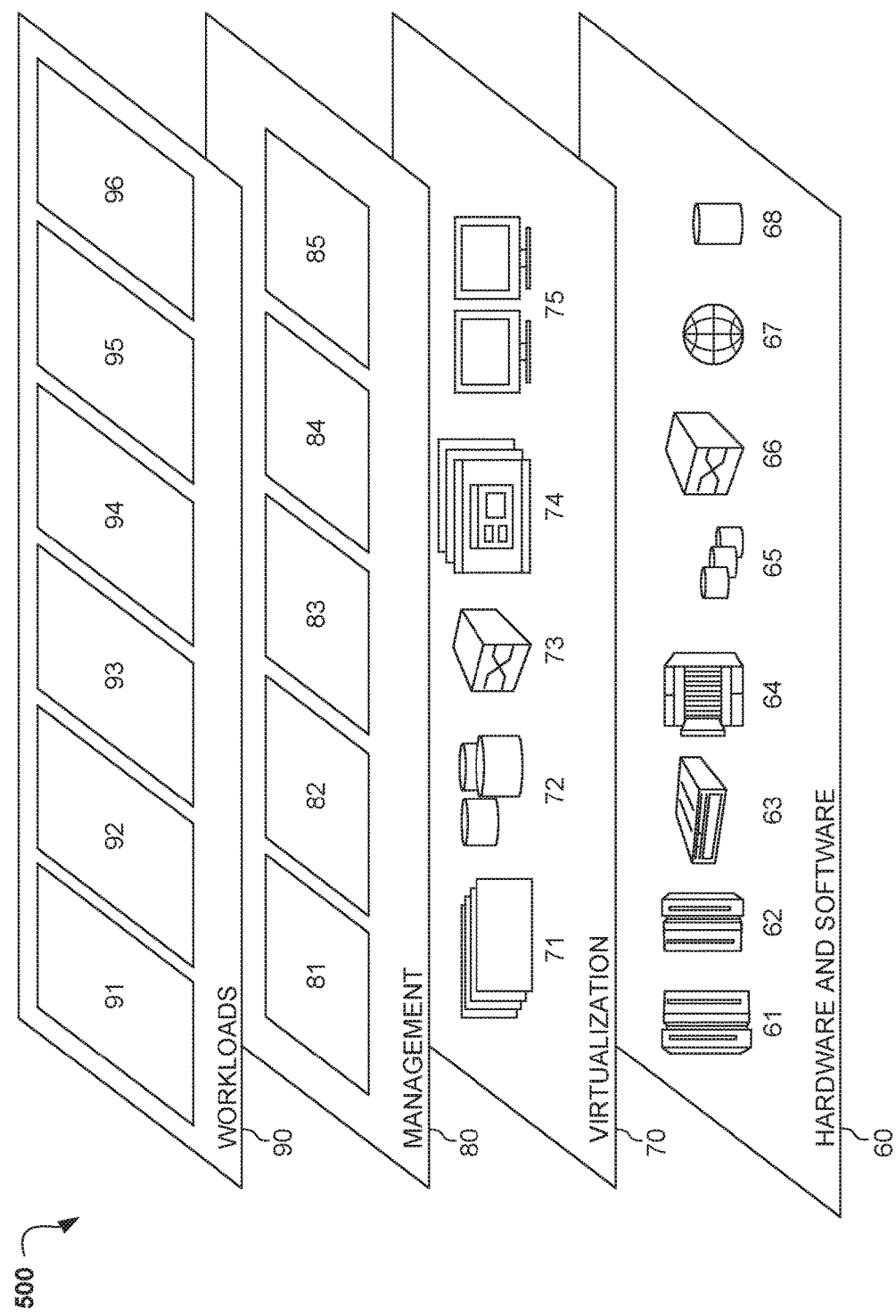
FIG. 5 depicts abstraction model layers according to an embodiment of the present invention.

Referring now to FIG. 5, a set of functional abstraction layers 500 provided by cloud computing environment 50 is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and concept disambiguation 96. Concept disambiguation 96 may relate to identifying concepts in a text, determining hypotheses for each concepts and picking the correct hypothesis for each concept using a neural network that validates the hypothesis.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method to improve determination of a valid sense of a concept by concept disambiguation in a natural language input, the method comprising:
   receiving a plurality of text;
   determining a concept is present in the plurality of text;
      determining a set of hypotheses for the determined concept, wherein the set of hypotheses is a plurality of natural language representations of the determined concept, and wherein determining the set of hypotheses for the determined concept comprises:
         analyzing a plurality of concept ontology data for the determined set of hypotheses corresponding to the determined concept; and
         associating the determined set of hypotheses with the determined concept, wherein associating the determined set of hypotheses with the determined concept is based on converting the determined concept into a word embedded vector and determining a similar vector in the analyzed plurality of concept ontology data;
   substituting the determined concept in the plurality of text with a hypothesis from the determined set of hypotheses;
   determining the hypothesis is valid based on analyzing the plurality of text with a neural network, wherein the neural network is trained for hypothesis validation;
   storing the plurality of text with the determined hypothesis in place of the substituted concept based on determining that the hypothesis is valid; and
   displaying the stored plurality of text.

2. The method of claim 1, further comprising:
   determining a next hypothesis from the determined set of hypotheses for the determined concept;
   based on determining the next hypothesis, determining that the next hypothesis is valid based on analyzing the plurality of text with the neural network;
   storing the plurality of text with the determined next hypothesis based on determining that the next hypothesis is valid; and
   displaying the plurality of text with the next hypothesis.

3. The method of claim 1, further comprising:
   displaying the plurality of text and the determined set of hypotheses;
   determining a correct hypothesis based on a user input; and
      training the neural network with the plurality of text and the determined correct hypothesis.

4. The method of claim 1, wherein determining that the hypothesis is valid further comprises:
   analyzing the plurality of text with the neural network;
   receiving an output from the neural network;
   based on determining that the received output from the neural network is above a threshold value, determining that the hypothesis is valid; and
   based on determining that the received output from the neural network is below the threshold value, determining that the hypothesis is invalid.

5. The method of claim 4, wherein the received output comprises a weighted average of a local context parameter and a document context parameter, and wherein the local context parameter establishes a syntactic validity of the hypothesis, and wherein the document context parameter establishes a topic validity of the hypothesis in a context of the plurality of text.

6. A computer system to improve determination of a valid sense of a concept by concept disambiguation in a natural language input, the computer system comprising:
   one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
   receiving a plurality of text;
   determining a concept is present in the plurality of text;
      determining a set of hypotheses for the determined concept, wherein the set of hypotheses is a plurality of natural language representations of the determined concept, and wherein determining the set of hypotheses for the determined concept comprises:
analyzing a plurality of concept ontology data for the determined set of hypotheses corresponding to the determined concept; and
associating the determined set of hypotheses with the determined concept, wherein associating the determined set of hypotheses with the determined concept is based on converting the determined concept into a word embedded vector and determining a similar vector in the analyzed plurality of concept ontology data;
substituting the determined concept in the plurality of text with a hypothesis from the determined set of hypotheses;
determining the hypothesis is valid based on analyzing the plurality of text with a neural network, wherein the neural network is trained for hypothesis validation;
storing the plurality of text with the determined hypothesis in place of the substituted concept based on determining that the hypothesis is valid; and
displaying the stored plurality of text.

7. The computer system of claim 6, further comprising:
determining a next hypothesis from the determined set of hypotheses for the determined concept;
based on determining the next hypothesis, determining that the next hypothesis is valid based on analyzing the plurality of text with the neural network;
storing the plurality of text with the determined next hypothesis based on determining that the next hypothesis is valid; and
displaying the plurality of text with the next hypothesis.

8. The computer system of claim 6, further comprising:
displaying the plurality of text and the determined set of hypotheses;
determining a correct hypothesis based on a user input; and
training the neural network with the plurality of text and the determined correct hypothesis.

9. The computer system of claim 6, wherein determining that the hypothesis is valid further comprises:
analyzing the plurality of text with the neural network;
receiving an output from the neural network;
based on determining that the received output from the neural network is above a threshold value determining that the hypothesis is valid; and
based on determining that the received output from the neural network is below the threshold value, determining that the hypothesis is invalid.

10. The computer system of claim 9, wherein the received output comprises a weighted average of a local context parameter and a document context parameter, and wherein the local context parameter establishes a syntactic validity of the hypothesis, and wherein the document context parameter establishes a topic validity of the hypothesis in a context of the plurality of text.

11. A non-transitory computer program product to improve determination of a valid sense of a concept by concept disambiguation in a natural language input, the computer program product comprising:
one or more computer-readable tangible storage medium and program instructions stored on at least one of the one or more tangible storage medium, the program instructions executable by a processor, the program instructions comprising:
program instructions to receive a plurality of text;
program instructions to determine a concept is present in the plurality of text;
program instructions to determine a set of hypotheses for the determined concept, wherein the set of hypotheses is a plurality of natural language representations of the determined concept, and wherein program instructions to determine the set of hypotheses for the determined concept comprises:
program instructions to analyze a plurality of concept ontology data for the determined set of hypotheses corresponding to the determined concept; and
program instructions to associate the determined set of hypotheses with the determined concept, wherein program instructions to associate the determined set of hypotheses with the determined concept is based on program instructions to convert the determined concept into a word embedded vector and determining a similar vector in the analyzed plurality of concept ontology data;
program instructions to substitute the determined concept in the plurality of text with a hypothesis from the determined set of hypotheses;
program instructions to determine the hypothesis is valid based on analyzing the plurality of text with a neural network, wherein the neural network is trained for hypothesis validation;
program instructions to store the plurality of text with the determined hypothesis in place of the substituted concept based on determining that the hypothesis is valid; and
program instructions to display the stored plurality of text.

12. The non-transitory computer program product of claim 11, further comprising:
program instructions to determine a next hypothesis from the determined set of hypotheses for the determined concept;
based on determining the next hypothesis, program instructions to determine that the next hypothesis is valid based on analyzing the plurality of text with the neural network;
program instructions to store the plurality of text with the determined next hypothesis based on determining that the next hypothesis is valid; and
program instructions to display the plurality of text with the next hypothesis.

13. The non-transitory computer program product of claim 11, further comprising:
program instructions to display the plurality of text and the determined set of hypotheses;
program instructions to determine a correct hypothesis based on a user input; and
program instructions to train the neural network with the plurality of text and the determined correct hypothesis.

14. The non-transitory computer program product of claim 11, wherein program instructions to determine that the hypothesis is valid further comprises:
program instructions to analyzing the plurality of text with the neural network;
program instructions to receive an output from the neural network;
based on determining that the received output from the neural network is above a threshold value, program instructions to determine that the hypothesis is valid; and based on determining that the received output from the neural network is below the threshold value, program instructions to determine that the hypothesis is invalid.

\* \* \* \* \*